United States Patent Office.

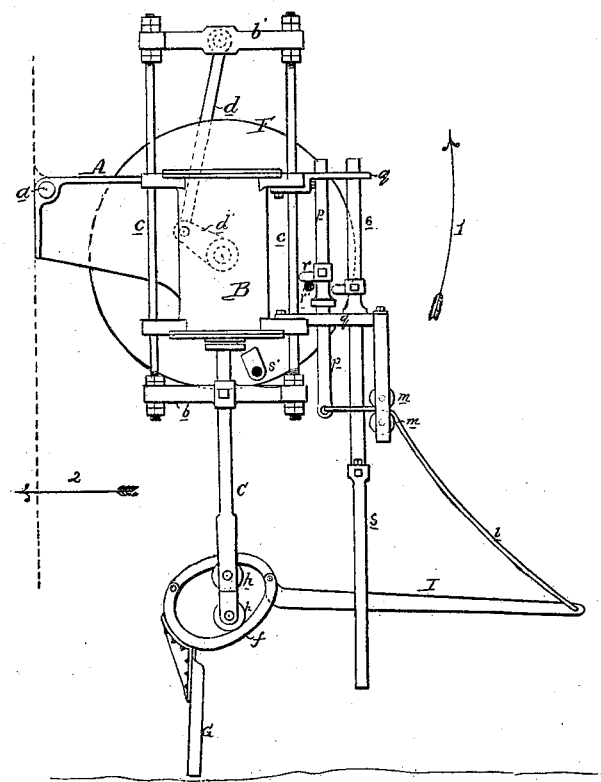

ALFRED LAFAYETTE KENNEDY, OF PHILADELPHIA, PENNSYLVANIA.

Letters Patent No. 109,019, dated November 8, 1870; antedated October 22, 1870.

IMPROVEMENT IN DIGGING-MACHINES FOR AGRICULTURAL PURPOSES.

The Schedule referred to in these Letters Patent and making part of the same.

I, ALFRED LAFAYETTE KENNEDY, of Philadelphia, county of Philadelphia, State of Pennsylvania, have invented certain Improvements in Digging-Machinery, of which the following is a specification.

Nature and Object of the Invention.

My invention consists in the attachment, to a traction-engine or other vehicle, of a digging device, composed of a spade or spading fork, operated by the direct action of a steam-engine, without the intervention of cranks, cog-wheels, or other contrivances for producing rotary motion, as hereafter described; and My invention consists further of a certain cam, and of devices connected therewith, for enabling the spade to be thrust into the ground while the machine is moving forward, and also of a peculiar method of hinging the frame which carries the digging devices to the traction-engine or vehicle, all of which will be fully described hereafter.

Description of the Accompanying Drawing.

Figure 1 is a side elevation of my improved digging-machine;

Figure 2, a view of the lower portion of the same with the working parts in a different position;

Figure 3, an end view of fig. 1; and

Figure 4, a detached perspective view of part of the machine.

General Description.

The frame A of the machine is so secured to the rear end of the frame of a traction-engine, or to any suitable vehicle, by a hinged joint, a, that it can be readily detached from the same, and the joint is of such a character as to prevent the said frame from being depressed beyond a horizontal position, but permits it, under the circumstances described hereafter, to yield vertically, as indicated by the arrow 1 in fig. 1.

An inverted steam-cylinder, B, is permanently secured to the frame A, and to its piston-rod, C, is attached a cross-head, b, which is connected by means of rods c c to a cross-head, b', above the cylinder, and from this latter cross-head motion is communicated through a connecting-rod, d, and crank d' to a fly-wheel, F, the shaft of which turns in suitable bearings.

As the valves and other portions of the engine do not differ materially from those in common use, it has not been deemed necessary to illustrate or describe them.

The digging-tool, G, resembles, in general form, an ordinary spade or spading-fork, and is rigidly secured to a cam, H, which is attached to or formed at one end of an arm or lever, I, the latter and the said tool being arranged at about right angles to each other, as best observed in fig. 1.

The cam H serves as a means of attaching the digging-tool to the lower forked end of the piston-rod C, and forms an important feature of my invention.

It consists of a single curved bar, e, above, and of two curved bars, f f, beneath, the latter being situated a short distance apart from but parallel to each other, (see fig. 4.)

The inner edges of these curved bars serve as ways for rollers, h and h', in the lower forked end of the piston-rod C, the cam H, with its digging-tool, and arm I hanging suspended from the roller h when the piston-rod is raised, as shown in figs. 1 and 2, but this roller being free, and the lower rollers h' in contact with the bars f f of the cam when the piston-rod is descending, as seen in fig. 3.

To the outer end of the arm I is attached a cord or chain, l, which, after passing between guide-rollers m m of the frame A, is connected to the lower end of a vertical rod, p, which slides in guides q q of the said frame, this rod having, between the guides, a projection or lug, r, which, at every revolution of the fly-wheel F, is arranged to be struck and raised by a pin, r', of the latter, for a purpose which will be rendered apparent hereafter.

The arm I also passes through the slotted lower end of, and is controlled by, a second vertical sliding rod, s, which has likewise a lug arranged to be struck and lifted by a pin, s', of the fly-wheel, on the revolution of the latter.

Operation.

It should be understood in the outset that, in addition to the regular reciprocating motion of the piston-rod, by which the digging-tool is operated, there is a uniform forward movement of the whole machine in the direction of the arrow 2, figs. 1 and 2. It is this latter movement which renders the employment of the cam H necessary, for the instant the edge of the digging-tool is caused to enter the ground its forward movement is arrested, while that of the piston-rod continues, so that, while the downward thrust of the latter is forcing the tool into the ground it must be free to move forward (that is, to traverse the curved ways of the cam) without communicating the same motion to the tool.

For instance, while the parts are in the position shown in fig. 1, that is, with the spade elevated slightly above the surface of the ground, the cam H, suspended from the roller h of the piston-rod, and the arm I maintained in a horizontal position, or thereabout, by means of the cord l, let it be supposed that the machine is moving forward and the piston-rod descending. As soon as the lower edge of the spade touches the surface of the ground the cam ceases to be suspended from the piston-rod, and the upper roller h is freed, but the pressure of the lower roller or rollers $k'$ is immediately brought to bear upon the curved ways $ff$ of the cam, causing the spade to be thrust downward into the ground with the descent of the piston-rod. These rollers will, at the same time, travel upon the curved ways toward the spade, without moving the same forward, (which would cause a rupture or serious straining of the machine,) until the several parts have assumed the position shown in fig. 2—in other words, until the rollers bear upon that portion of the cam immediately above the spade, and the latter has reached the limit of its downward movement.

At this instant the pin $s'$, which is placed close to the periphery of the fly-wheel F, strikes and raises the slotted rod $s$, and, consequently, lifts the arm I, turning the same, the cam H, and the spade to the position shown by dotted lines in fig. 2. During this movement the earth, at the point $x$, serves as a fulcrum, just as with an ordinary hand-spade, thus diminishing the strain upon the parts, and the leverage gained by the use of the arm I is such that the entire mass of earth in front of the spade will, on the movement of the latter, be lifted and overturned with the greatest facility.

This movement is effected in the short interval of time that elapses while the direction of the motion of the piston-rod is being changed, and while the latter is moving forward to the extremities of the ways $ff$, and just before the completion of the said movement the piston-rod begins to rise, causing the cam to be suspended from its roller $h$, and the spade to be, consequently, raised clear of the ground.

Before the piston-rod reaches the limit of its upward movement, however, the sliding-rod $s$ is released by the pin $s'$, and permitted to descend, so that the arm I, no longer sustained by the said rod, will fall to its original position.

On the second descent of the piston-rod the same operation will be repeated, the spade cutting into and overturning the earth at a short distance in advance of the former cut, and this may be repeated and continued with rapidity and regularity for any required distance.

It should be understood that the only object of the cord $l$ is to hold up the outer end of the arm I, and to maintain the spade in a proper position for receiving the power of the piston-rod. It should also be understood that the rod $p$, to which the said cord is attached, is raised slightly on every motion of the fly-wheel, for the purpose of tightening the cord, so as to maintain the arm I and spade in the most advantageous positions during the descent of the piston-rod.

It will be evident that an eccentric or eccentrics on the crank-shaft may be used in place of the pins on the fly-wheel.

The object in hinging the frame A to the road-engine, or other vehicle to which it is attached, is to enable the said frame to yield instantly, and thus prevent the breaking or straining of any portion of the machinery should the spade, in its descent, meet with rocks or other obstructions.

The hinged joint also enables the digging-machine to be readily detached from the road-engine or truck, when the latter is to be used for other purposes.

Although I prefer to operate the spade directly by means of a separate engine attached to the frame A, as above described, yet it will be evident that sufficient power may be transmitted from the propelling engine to operate a rod, the equivalent of the piston-rod C, and the parts connected therewith, without departing from the main features of my invention.

The above machine, although intended principally as a substitute for the plow, to be used in tilling the soil, can, it will be evident, be so modified and enlarged as to form an efficient excavating machine.

Claims.

1. The attachment of a traction-engine, or other vehicle, of a digging-device, consisting of a spade G, actuated by a reciprocating rod C, through the medium of the cam H, lever I, rods $s$ and $p$, cord $i$, fly-wheel F, and its pin $s'$, or of other equivalent devices which will produce a like effect.

2. The cam H, carrying the spade or digger G, and consisting of curved ways $e$ and $f$, adapted to the rollers $h$ and $k'$ of the rod C, all substantially as herein set forth.

3. The combination of the cam H, its digger G, reciprocating rod C, and lever I, the latter being operated substantially as described, through the medium of the devices herein described or their equivalents.

4. The hinging of the frame A, which carries the digging mechanism to the traction-engine or vehicle, substantially as described.

In testimony whereof, I have signed my name to this specification in the presence of two subscribing witnesses.

ALFRED LAFAYETTE KENNEDY.

Witnesses:
LOUIS BOSWELL.
HARRY SMITH.